United States Patent [19]

Firebaugh

[11] Patent Number: 4,570,253
[45] Date of Patent: Feb. 11, 1986

[54] TONE ARM

[76] Inventor: William H. Firebaugh, 3108 McKinley Way, Costa Mesa, Calif. 92626

[21] Appl. No.: 659,952

[22] Filed: Oct. 11, 1984

[51] Int. Cl.[4] .......................... G11B 3/10; G11B 3/18; G11B 3/12; G11B 3/30
[52] U.S. Cl. .................... 369/255; 369/244; 369/246; 369/252
[58] Field of Search ............... 369/263, 247, 255, 246, 369/244, 252, 24

[56] References Cited

U.S. PATENT DOCUMENTS

| | | | |
|---|---|---|---|
| 3,028,161 | 4/1962 | Siebert | 369/255 |
| 3,088,742 | 5/1963 | Alexandrovich | 369/255 |
| 3,556,537 | 1/1971 | Stacy | 369/255 |
| 3,682,485 | 8/1972 | Guha | 369/255 |
| 3,836,155 | 9/1974 | Joannou | 369/255 |

FOREIGN PATENT DOCUMENTS 1082246 9/1967 United Kingdom ............... 369/255

Primary Examiner—Steven L. Stephan
Attorney, Agent, or Firm—Lawrence Fleming

[57] ABSTRACT

A tone arm for a phonograph pickup having a bifilar flexible ligament suspension for vertical and lateral displacement. The suspension takes the place of the more usual pivots, and employs a pair of thin flexible ligaments or fibers in a skewed convergent torsional bifilar configuration. The lower ends of the two ligaments are attached to a basal element, which may be shaped as a disc, connected to and lying below the arm itself. The flexibility of the ligaments confers freedom to the arm for angular displacement in the vertical and horizontal planes, but the skew prevents linear displacement along the direction of its length. The basal element is preferably immersed in a container of viscous liquid to damp movement of the arm.

9 Claims, 5 Drawing Figures

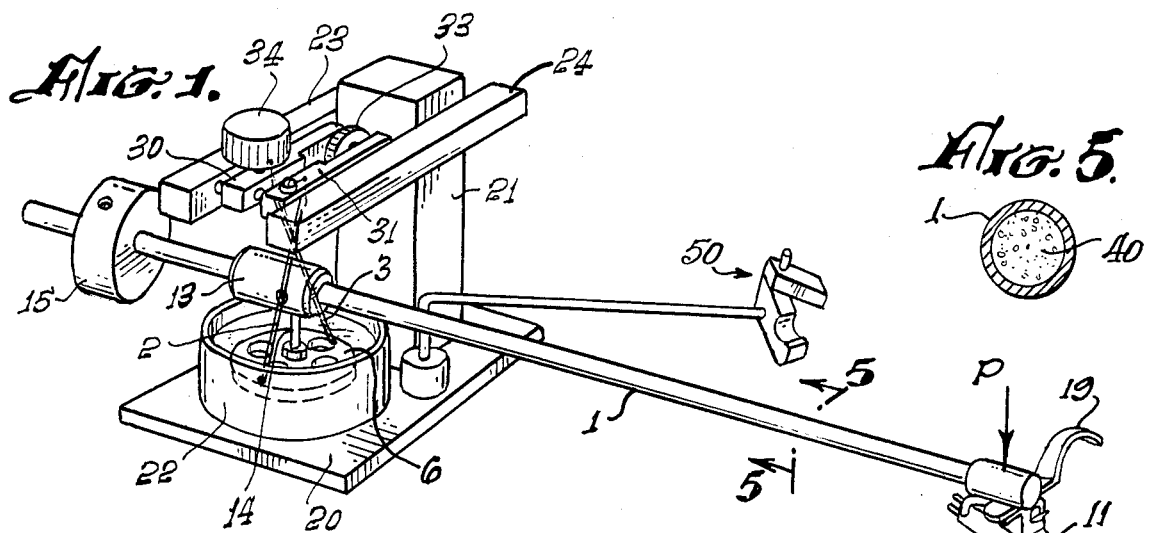
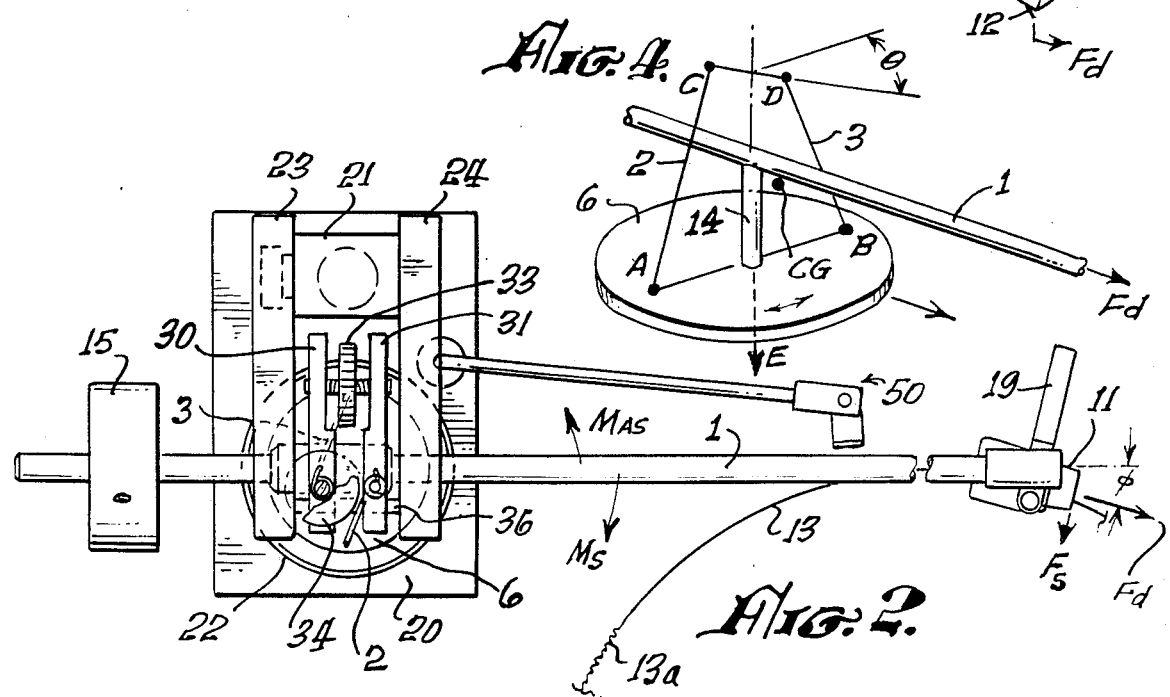
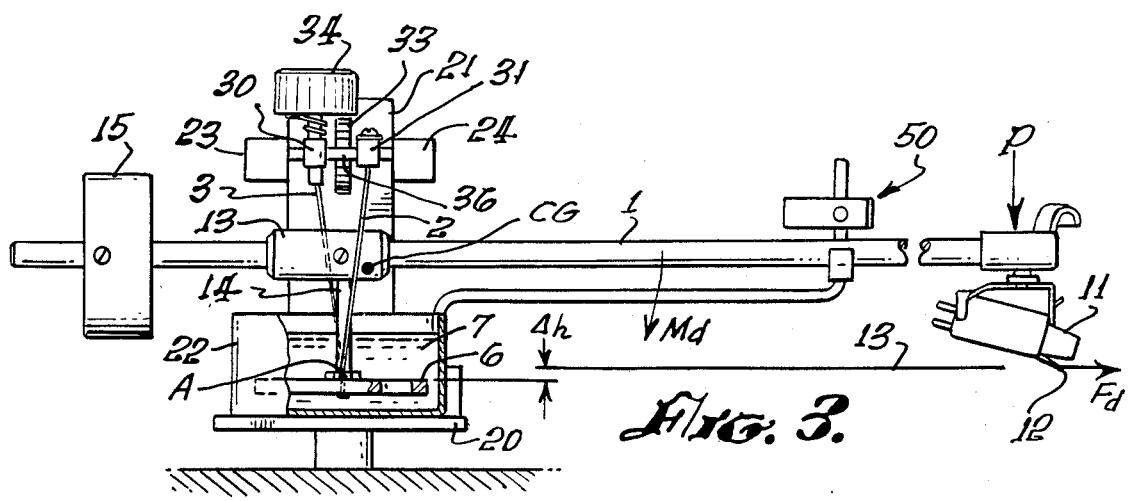

TONE ARM

BRIEF SUMMARY

This invention is an improved tone arm for supporting and guiding a phonograph pickup cartridge for playing disc records with high fidelity of reproduction. The improvements lie primarily in the suspension and constraint means which perform the functions of the prior vertical and lateral pivots at the base portion of a typical prior arm device. The present suspension means are free from coulomb friction. They incorporate fluid damping and resolve drag forces and vertical displacements of the stylus in a way to improve tracking at low stylus pressure.

The principal element of the present invention is a pair of fine flexible ligaments disposed as a skewed convergent bifilar suspension. The lower ends of the two ligaments are attached at separated points on an arm basal element (which may also be immersed in a viscous fluid to provide damping) located below and rigidly connected to the arm itself, at whose outer end the phono pickup cartridge is attached. These separated points of attachment of the ligaments lie along a generally horizontal line at about right angles to, and substantially below, the arm itself, and in or slightly below the horizontal plane of the record surface. These attachment points serve as the pivot points of the arm for vertical motion of the pickup cartridge, by the bending of the ligaments. The upper ends of the ligaments are attached to stationary adjustable supports somewhat closer together than their lower ends.

Freedom for lateral displacement of the cartridge about a vertical axis, as for following the record grooves radially inward, is provided by torsional or twisting displacement of the same bifilar suspension. Fore-and-aft or tangential displacement of the cartridge is somewhat resisted by the "skew" or initial torsional displacement of the suspension. In a skewed suspension, a line connecting the top ends of the ligaments is not parallel to the line connecting their lower ends. In this device, the skew angle between said lines may typically be about 90 degrees.

The skew of the suspension also acts to provide an anti-skating moment or torque as a function of the tangential drag force exerted on the stylus by the record groove. This radially-outward moment opposed the normal inward-directed "skating" moment which is induced because the movement of the record past the stylus is not parallel to the line connecting the stylus to the pivot of the tone arm. This known skating moment tends to make the stylus skip across the grooves toward the center of the record under conditions of low stylus pressure and heavy groove modulation. The present suspension generates an opposing moment when it is required, i.e., the tendency to skate can be made relatively independent of groove modulation.

The present suspension geometry also provides a variation in downward stylus pressure as a function of stylus drag, so that the stylus pressure increases during increased groove modulation, i.e., during loud passages. Thus, stylus pressure is automatically adjusted to the requirements of the record, being light during soft passages and heavier during loud ones, to provide optimum tracking at minimum record wear. Another property of the suspension is that the stylus pressure changes proportionate with the vertical position of the cartridge; this improves performance on warped or bumpy records, because the stylus pressure remains more nearly constant as the arm responds to the warps and bumps and the deflection of the cartridge cantilever resulting from the warps and bumps is suppressed. The reason for this property is that the center of gravity of the whole arm assembly is above the point of suspension for vertical displacement of the stylus. Thus, when the cartridge is moved upward, the center of gravity moves toward the rear.

To damp the suspension, the arm basal element, referred to above, is preferably immersed in a container of viscous liquid. This basal element, disposed below and rigidly connected to the arm, may preferably be generally disc-shaped. When the cartridge moves along a radius of the record, the basal element will rotate in the fluid, and when the cartridge moves up and down, it will tilt.

The ligaments themselves may be made of plastic filament about 0.2 mm in diameter, such as is used for fish leaders. Their upper points of attachment are preferably made adjustable for separation. Also, one point is desirably made adjustable up and down, to level the basal element.

The arm itself is preferably made of light thin-wall tubing and filled with damping material, such as sand; without this damping, arm resonances have been detected in the reproduced sound.

IN THE DRAWING

FIG. 1 is a perspective view of a complete tone arm and suspension apparatus according to the invention;

FIG. 2 is a top view of the arm of FIG. 1;

FIG. 3 is a side view of the arm of FIG. 1;

FIG. 4 is a diagrammatic showing of the bifilar suspension; and

FIG. 5 is a section on line 5—5 of FIG. 1.

DETAILED DESCRIPTION

Referring first to FIG. 1, a light arm member 1 carries a phonograph pickup cartridge 11 at its outer end portion in known manner. A suitable handle device may be provided as at 19. A rest 50 of any suitable design is provided to hold the arm safely when a record is not being played. A stylus is indicated at 12. The stylus pressure (actually a force) downward against the record is indicated by arrow P. The tangential drag force of the record groove on the stylus 12 is indicated as arrow $F_d$.

Near the rear or base portion of arm 1 is a suitable fitting 13, a stem-like connecting member 14, and a disc-like arm basal element 6, all fastened rigidly together. Arm 1 is supported from basal element 6 by a bifilar suspension.

The bifilar suspension ligaments or fibers are shown at 2, 3, FIGS. 1-4. They are attached to basal element 6 at diametrically oppose basal points and extend upward to fixed attachment points on each of two parallel arm-like supports 30, 31. These supports are movable slidably on pins or the like, not shown, so that the spacing between them can be adjusted. A suitable adjusting device is shown as a thumbwheel 33 with right-hand and left-hand screws extending from it, such as is used in a draftsman's compass. Another adjustment provided is for the length of one ligament 3 in order to level the basal element 6; this is shown at 34 as a knob to turn a small shaft around which the end portion of ligament 3 is wrapped. See FIG. 2 where part of knob 34 is shown cut away. This adjustment works like a tuning peg on a musical instrument.

At the rear end portion of arm 1 is a conventional counterweight 15, suitably adjustable along arm 1.

Basal element 6 is preferably immersed in a cup 22 of viscous damping fluid 7, FIGS. 1 and 3. Commercial silicone fluid of 100,000 centistrokes viscosity has been found suitable. Element 6 may thus serve both as part of the suspension system and as a damping "paddle".

It will be apparent that the weight of the whole tone arm assembly hangs on the two ligaments 2, 3, and that these are the support and guiding means of that assembly.

Radial ("lateral") displacement of cartridge 11 rotates element 6 and vertical displacement tilts it. The ratio of the radial to the lateral damping constant (which constants may be expressed in dyne-cm/radian/sec) depends on the shape of element 6. A relatively thick disc, about 38×3 mm with four 1-cm holes, as shown, provides a desirable, lower, ratio than a plain thin disc. Other suitable shapes are obviously possible. The optimum damping constants vary with the stylus compliances of cartridge 11.

The geometry of the suspension is now described with reference to FIGS. 1-4. In FIG. 4, the arm basal element 6, the connecting element 14, and a portion of arm 1 are indicated in simplified form. Points A and B are the attachment points or basal points of ligaments 2, 3 to arm basal element 6, and are suitably located generally along a diameter thereof. Points C and D indicate the upper, fixed attachment points of the ligaments (as to supports 30, 31 in FIGS. 1-3). It is apparent that the distances A-B and C-D are unequal, this defining a convergent bifilar suspension. It is also apparent that lines AB and CD are not parallel, this defining a bifilar suspension with initial displacement, or skewed.

The properties of the suspension are now considered. Referring to FIGS. 1-4, it is apparent that if arm 1 is free to swing in a horizontal plane, it will turn radially toward the outside rim of the record, since the tension in ligaments 2, 3 (due to the weight of the arm) has tangential components that create a torque or moment in that direction. This moment is indicated by arrow $M_{as}$ in FIG. 2.

The magnitude of $M_{as}$, here called the anti-skating moment, is a function of the tensile forces in ligaments 2, 3 due to the weight of the arm assembly and the geometry of the suspension, which includes (1) skew angle and (2) convergence. The skew angle $\theta$, FIG. 4, is desirably made about 90° when the stylus is in the middle of an average recording; the moment $M_{as}$ will vary as the sine of $\theta$. Over an average 12-inch disc recording $M_{as}$ varies less than about 10 percent.

A convenient way to adjust the moment $M_{as}$ is to vary the convergence, i.e., the distance CD, FIG. 4. This is conveniently done with the thumb screw 33, FIGS. 1-3.

The utility of the anti-skating moment $M_{as}$ is now considered.

In FIG. 2, the moment $M_s$, indicated by arrow, is the "skating moment" produced by the inward-directed radial component $F_s$ of the stylus drag force $F_d$. Component $F_s$ exists because the movement of the record past the stylus is not parallel to the line connecting the stylus to the pivot of the tone arm. When the stylus fails to track due to too-light stylus pressure P (FIGS. 1 and 3) relative to heavy modulation of record groove 13, as at 13a, FIG. 2, the skating moment $M_s$ sends the pickup "skating" across the grooves toward the center of the record. The above-described moment $M_{as}$, the anti-skating moment, opposes this. Thus, the present suspension operates to improve stylus tracking.

Moreover, the stylus drag force $F_d$ itself contributes additionally to the anti-skating moment $M_{as}$. Referring to FIGS. 1-4, it is seen that the stylus drag force $F_d$ increases the tension in suspension ligament 3 and reduces the tension in ligament 2. This difference in tension produces a torque directed radially outward toward the rim of the record, i.e., an increase in the anti-skating moment $M_{as}$. Thus, $M_{as}$ automatically increases when it is more needed, i.e., during loud passages on the record.

Another feature of the present suspension is an automatic increase in stylus pressure P in response to an increase in stylus drag force $F_d$. See particularly FIG. 3. The attachment points ("basal points") of ligaments 2, 3 at the top surface of arm basal element 6 are preferably in the same horizontal plane 13 as stylus 12; but may lie in a plane slightly lower by a distance indicated as $\Delta h$. The stylus drag force $F_d$ here would produce an "overturning" moment $M_d$ which adds to the stylus pressure P. Thus, tracking may be additionally improved during loud passages on the record. During soft passages when the additional pressure is not needed, it is reduced or eliminated, so that tracking at light average stylus pressure is improved and record wear reduced.

Another property of the suspension is the stabilization of stylus pressure when playing warped or bumpy records. Warps and bumps can cause the stylus cantilever to deflect relative to the cartridge body and this causes the stylus to "scrub" back and forth in the record groove, resulting in frequency modulation of the signal output because the "scrubbing" action changes the relative velocity between the record groove and the stylus. The present suspension provides that the stylus pressure is reduced when the tone arm responds to an upward warp and is increased when responding to a downward warp. Thus, the stylus pressure remains more nearly constant and thus suppresses the effects of warped or bumpy records. See FIGS. 3 and 4. The center of gravity of the whole tone arm assembly 1, 11, 14, 15, 6 is indicated as a point CG. It is necessarily located a small distance forward of the suspension points A, B. When the cartridge 11 is moved upward, it is apparent that the arm 1 will tilt upward and that the center of gravity CG will move to the rear—since the effective vertical pivot point along line AB (see also FIG. 4) is located well below the center of gravity CG. Such rearward displacement of the center of gravity CG will obviously reduce the stylus pressure P. In one satisfactory model of the invention, an upward displacement of stylus 12 by 0.6 cm reduced stylus pressure P from 2 grams to 1.5 grams.

It is obviously possible to add an extra tensioning force and constraint to the suspension by an extra ligament, preferably spring-loaded, extending downward from the mid-point of line AB, as indicated by arrow E in FIG. 4; but in practice, gravity has been found adequate.

The arm 1 itself may preferably be made of thin-wall metal tubing about 0.8 cm in diameter and 0.25 mm thick. Listening tests have detected frequency-dependent non-linear distortion which was traced to arm resonances. This distortion was removed by filling the tubular arm with sand as a suitable damping material. See the cross sectional view of FIG. 5, showing arm 1 filled with such granular damping material 40.

In this specification and claims, the nomenclature on bifilar suspensions is taken from the book, "Torsion Devices" by P. J. Geary, published in 1960 by the British Scientific Instrument Research Association as BSIRA Research Report R-249 (142 p). See particularly p. 49-63. The term "skewed", as used herein, corresponds to "deflected", because the present suspension is initially deflected and remains deflected over its working range.

I claim:

1. A phonograph tone arm apparatus for playing disc records, comprising:
    an arm member adapted to carry a phonograph pickup cartridge at its outer end portion,
    a basal element disposed below a rear portion of said arm and means rigidly connecting said basal element and arm; and
    a pair of flexible suspension ligaments disposed spacedly about a vertical axis and connected to spaced basal points on said basal element and extending generally upward to upper attachment points on stationary upper supports, said ligaments forming a skewed convergent bifilar suspension,
    torsional deflection of said suspension conferring freedom to said arm for angular displacement in a horizontal plane about said axis,
    said upper attachment points lying on a line non-parallel to a line joining said basal points and defining a skew angle therewith,
    the flexibility of said ligaments conferring freedom to said arm for angular displacement in a vertical plane about an axis passing substantially through said base points.

2. Tone arm apparatus as in claim 1 further comprising:
    a container of viscous liquid disposed under and around said basal element, said element being substantially immersed in said liquid to damp motion of said arm.

3. Tone arm apparatus as in claim 2 wherein said basal element is substantially flat and disposed generally horizontally, and is generally symmetrical about a line connecting said basal points.

4. Tone arm apparatus as in claim 3 wherein said basal element is shaped as a disc, said basal points being disposed symmetrically on a diameter thereof.

5. Tone arm apparatus as in claim 4 wherein said basal element is perforated and of a thickness at least about one-fifteenth its diameter, to present substantial shearing surface to said liquid in both rotation and tilt.

6. Tone arm apparatus as in claim 1 wherein said stationary upper supports are adjustable to adjust the distance between said upper attachment points, said points being closer together than said basal points to define a convergent bifilar suspension.

7. Tone arm apparatus as in claim 1 wherein said basal points lie in approximately the same horizontal plane as the playing surface of a said record.

8. Tone arm apparatus as in claim 1 wherein said skew angle is about 90 degrees when a stylus on a said cartridge is about in the middle of the recorded portion of a record.

9. Tone arm apparatus as in claim 3 wherein said arm member is thin and hollow and packed with sand-like granular material to damp its mechanical resonances.

* * * * *